United States Patent Office 3,816,511
Patented June 11, 1974

3,816,511
METHOD FOR PREPARING POLYESTERS BY THE POLYMERIZATION OF EPSILON CAPROLACTONES
Christian Burba, Luenen, and Eugen Griebsch, Unna, Germany, assignors to Schering AG, Berlin and Bergkamen, Germany
No Drawing. Filed Sept. 7, 1971, Ser. No. 178,399
Claims priority, application Germany, Feb. 26, 1970, P 20 09 885.5; Nov. 7, 1970, P 20 54 903.5; May 14, 1971, P 21 23 968.9
Int. Cl. C07c 69/66
U.S. Cl. 260—484 A    16 Claims

ABSTRACT OF THE DISCLOSURE

Methods for polymerizing lactones of the formula

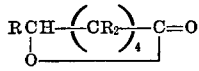

wherein R is hydrogen, methyl, or ethyl, in the presence of antimony (V) fluoride, antimony (V) chloride, or a trialkyl oxonium salt as a catalyst; and in the further presence of a non-basic organic compound (optional when a trialkyl oxonium salt is employed) having active hydrogen atoms, such as a hydroxy compound, functioning to open the lactone ring.

---

The present invention relates to methods for preparing polyesters by the polymerization of lactones.

Methods for preparing polyesters by the polymerization of lactones in the presence of organic compounds capable of opening the lactone ring are known in the prior art. For example, German patent publication DAS 1,213,995 teaches the polymerization of lactones of the formula

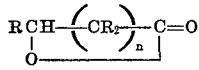

in the presence of acid inorganic compounds as catalysts. In the formula, n is at least 4, the R's, which may be the same or different, are hydrogen, alkyl, cycloalkyl, alkoxy, or aryl such that the total number of carbon atoms in the substituents R on the lactone ring is not greater than 12 and at least n+2 of the groups R are hydrogen atoms. The polymerization proceeds in the presence of organic compounds having at least one hydroxy group or amino group and in the presence of sulfuric acid, phosphoric acid, hydrogen chloride, boron trifluoride, or zinc chloride at temperatures of 20° C. to 180° C.

German patent publication DAS 1,247,019 teaches the polymerization of an excess of a lactone of the general formula

with organic compounds having at least one hydroxy group or amino group at temperatures of from 50° C. to 300° C., preferably in the presence of a catalyst. In the formula, n is at least 4 and the R's, which may be the same or different, are hydrogen, alkyl, cycloalkyl, alkoxy, or aryl such that the total number of carbon atoms in the substituents R does not exceed 12 and at least n+2 of the groups R are hydrogen atoms.

It is also known that the inorganic acid catalysts employed in the process of the aforementioned DAS 1,213,995 may not remain present in those polyester products which are to be reacted with isocyanates because the presence of the acids disturbs such reactions. This has caused great emphasis to be placed on the preparation of polyesters of extraordinary purity.

The inorganic acid catalysts additionally have the disadvantage that they have a dehydrating effect which considerably influences the process as well as the products produced thereby. Additionally, some of the polyesters prepared according to DAS 1,213,995 have a large carboxyl number, which is in general undesirable for reaction with isocyanates.

The disadvantage of the method of DAS 1,247,019 is that too high temperatures and, often, extremely long reaction times must be employed in the polymerization. These very high temperatures, the long heating periods, and the use of strongly basic catalysts cause undesirable reactions and side reactions.

South African patent publication 6,803,176 [cf. Chem. Abstracts 70, 107006 (1969)] describes attempts to overcome the disadvantages of the process described above. According to this patent, polyesters are prepared by the treatment of lactones with compounds containing active hydrogen atoms suitable for opening the lactone ring, in the presence of organic carboxylic acids or of sulfonic acids having a pK value of less than 3. The process is carried out at low temperatures and forms polyesters of superior quality. For example, epsilon-caprolactone is heated in the presence of ethylene glycol and trichloroacetic acid for 20 hours at 45° C. The polyester formed has an hydroxy number of 56 and an acid number of 7.5. Suitable catalysts in addition to trichloroacetic acid are trifluoroacetic acid and p-toluene sulfonic acid.

However, even with the process of this South African patent the disadvantages of long reaction time and of undesirably high acid number in the polyester cannot be overcome. Thus, there remains a need for an improved process for polymerizing caprolactones.

An object of the present invention is to overcome these disadvantages of the prior art, particularly the long polymerization time and high reaction temperature which can influence the color of the polymer.

According to the present invention, polyesters are prepared by the polymerization of lactones of the formula

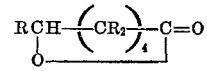

in the presence of antimony (V) fluoride, antimony (V) chloride, or trialkyl oxonium salts employed as catalysts in an amount from 0.001 to 0.5 percent, particularly from 0.03 to 0.06 percent, by weight of the reaction mixture. In the lactone formula given above, the R's, which may be the same or different, are hydrogen, methyl, or ethyl, but at most three of the groups R are alkyl.

The reaction is carried out with or without the use of an inert solvent at temperatures from −20° C. to 120° C., particularly below 50° C., and, in one embodiment, proceeds in the presence of a non-basic organic compound having an active hydrogen atom, e.g. hydroxy compounds, for opening the lactone ring. Suitable hydroxy compounds include saturated and monoolefinically unsaturated alcohols and polyols, hydroxycarboxylic acids, and polyester-polyols, for example. Polyester polyols having plural olefinic and/or acetylenic unsaturations can be employed when the catalyst is a trialkyl oxonium salt.

In another embodiment, trialkyloxonium salts are employed as catalysts for the polymerization of the lactone in the absence of non-basic organic initiator compounds.

Both substituted and unsubstituted caprolactones can be employed as reagents in the process of the invention, for example alkyl-, cycloalkyl-, aryl-, and alkoxy-substituted caprolactones. Alkyl substituted epsilon-caprolactones include lower alkyl-substituted compounds such as ethyl-, propyl-, or isopropyl-epsilon-caprolactone, or α-, β-, γ-, delta-, and epsilon-methyl-epsilon-caprolactone. Likewise, dialkyl- and trialkyl-epsilon-caprolactones (such as β,β delta-trimethyl-epsilon-caprolactone or β, delta, delta-trimethyl-epsilon-caprolactone) are suitable. However, in these compounds, the epsilon-carbon atom can have only one substituent. Cycloalkyl-substituted epsilon-caprolactones include cyclohexyl-epsilon-caprolactone, for example. A suitable aryl substituted epsilon caprolactone is phenyl-epsilon-caprolactone, for example. Lower alkoxy-substituted caprolactones such as methoxy- and ethoxy-caprolactone can also be used.

More in detail, non-basic organic compounds having active hydrogen atoms suitable for opening the lactone ring include primary, secondary, and tertiary hydroxy compounds having from 1 to 6 hydroxy groups. For example, alcohols such as methanol, ethanol, propanol, t-butanol and t-amyl alcohol, and preferably polyols, such as butanediol-1,4, hexanediol-1,6, trimethylhexanediol-1,6, trimethylolpropane, hexanetriol-1,2,6, pentaerythritol, and sugar alcohols like sorbitol, can be employed. Carbohydrates such as glucose, starch, and cellulose can also be mentioned. Further, synthetic polyols such as polyvinyl alcohol or hydrolysis products of ethylene-vinyl acetate copolymers are suitable as initiators. Hydroxy acids such as hydroxy stearic acid and hydroxy caproic acids can also be used.

These compounds are used in amounts such that the ratio of caprolactone to the non-basic ring-opening initiator compound is between 1:1 and about 100:1. Between these limits, polymers having average molecular weights between about 200 and about 10,000 are produced.

The reaction of the invention proceeds in the presence of an amount of catalyst from 0.001–0.5 percent by weight of the reaction mixture. Preferably, a catalyst concentration between 0.03 and 0.06 weight percent is used. The catalysts used in the method of the present invention are antimony (V)-fluoride, antimony (V) chloride, and trialkyl oxonium salts. The anions of the trialkyl oxonium salts include, for example, the tetrafluoroborate ion, the hexafluoro-antimonate (V) ion and, preferably, the hexachloroantimonate (V) ion. The alkyl groups of the trialkyl oxonium cation each have from 1 to 4 carbon atoms and are preferably ethyl. As mentioned earlier, when trialkyl oxonium salts are employed, the lactones can be homopolymerized without the addition of an hydroxy compound for opening the lactone ring.

The trialkyl oxonium salts are very effective catalysts which are, nevertheless, protective of a number of the more sensitive compounds, in contrast to the antimony (V) halides which are simultaneously very strong Friedel-Crafts catalysts. For example, when the trialkyl oxonium salts are employed as initiators for opening the lactone ring, polyols having plural olefinic and acetylenic unsaturations can be used as initiators without cross-linking of the polyols. Exemplary of such unsaturated polyols are polybutadiene diols of the formula

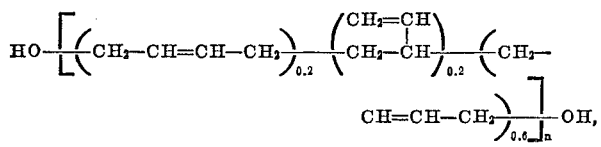

wherein $n$ has a value between 40 and 50. Materials of this type are commercially available under the tradename "Poly B–D." Their properties and structure are discussed, for example, in the article by J. A. Verdol et al. entitled, "Liquid Castable Elastomers from Hydroxyl-Terminated Polybutadienes," in Rubber Age (July 1966), pages 57–64, particularly page 58.

As is shown by comparative polymerization tests involving the catalysts of the present invention and the catalysts of the prior art, antimony (V) fluoride and chloride and trialkyl oxonium salts are superior for use in lactone polymerizations from the point of view both of the quality of the reaction product and the speed of the polymerization. The special reactivity of these catalysts even permits a reaction between non-basic organic compounds containing active hydrogen atoms (e.g. hydroxy compounds) and caprolactones in an inert solvent, for example methylene chloride, in a relatively short time at temperatures below 50° C. without heating. The use of inert solvents, which can be of advantage when the reaction involves initiators which are not readily soluble in caprolactone or when high-melting reaction products are produced, also permits a simple purification process to be appended to the method for preparing the polyesters containing hydroxy groups.

Inert solvents particularly useful in the present invention include chlorinated hydrocarbons such as methylene chloride and chloroform, and aromatic solvents, particularly aromatic hydrocarbons like benzene.

The polymer, prepared with the use of antimony (V) fluoride or chloride or trialkyl oxonium salts and dissolved in the inert solvent, can be freed of even the slightest traces of catalyst by adsorption using active clays or mixtures of active clays with active charcoal, without the need for an expensive washing process employing water. For this purpose, the concentrated solution of the polyester to be purified is suitably combined with about 0.5–2.5 percent, by weight of the polyester being treated, preferably about 1 percent, of a clay containing montmorillonite and heated to boiling for a short period of time. If desired, for example to lighten product color, about 0.5–2.5 percent, preferably about 1 percent, of active charcoal can also be added. After filtering off the adsorbing agent and removing the solvent, the almost colorless polyester is obtained in the degree of purity necessary for reaction with diisocyanates to form elastomers.

A particularly advantageous variation of the polymerization process involves hydrolyzing any antimony (V) halide catalyst at the conclusion of the polymerization by adding a small amount of water, and then reducing the acid number of the remaining material by esterifying free carboxyl groups, either with hydroxy groups present on the polyester or by adding a corresponding amount of additional polyhydroxy compound, e.g. an alkylene diol, in vacuum and at elevated temperature employing the antimony (V) oxide formed by the hydrolysis as a catalyst. In this way, the acid numbers can be reduced to 1/10 or less of their original value.

The polymerization of caprolactones in the presence of an initiator with the use of antimony (V) fluoride or chloride or trialkyl oxonium salts as a catalyst according to the present invention preferably takes place in the absence of oxygen, for example by operating under an atmosphere of an inert gas such as nitrogen.

Even extreme ratios of lactone to initiator, such as 100:1 which produces products having molecular weights of about 10,000, create no difficulty in the polymerization process of the invention and the reaction times still are short.

A better understanding of the present invention and of its many advantages will be had by referring to the following specific examples given by way of illustration.

EXAMPLE 1

A mixture of:

3,420 g. (30 mols) of epsilon-caprolactone (once distilled);
136.3 g. (1.5 mols) of butanediol-1,4; and
1,780 g. methylene chloride is preheated to 35° C. and combined with 0.3 ml. of antimony pentafluoride (density=2.99). The reaction mixture is reacted for 8 hours at 35° C. under nitrogen without further heating. Then the brownish solution of the polyester reaction product is combined with about 2 ml. of concentrated ammonia (to adjust the pH to 7–8), whereupon the color of the solution clearly brightens to yellow. About 1 percent of montmorillonite and about 0.5 percent of active charcoal, by weight of polyester, are added to the solution, and the mixture is heated for two hours at 50° C. After filtration of the solution, the methylene chloride is taken off in vacuum. A colorless, quickly-crystallizing polyester having the following properties is obtained in this manner:

Hydroxy number=43 (without reference to the acid number)
Acid number=1.8
Melting point=48°–49° C.

EXAMPLE 2

The following reagents are employed:

90.0 g. (1 mol) of butanediol-1,4;
2,280.0 g. (20 mols) of epsilon-caprolactone;
200 ml. benzene as an entraining agent; and
0.36 ml. of antimony pentafluoride.

The butanediol, caprolactone, and benzene are weighed together. By heating to 180° C., the benzene and any water present are distilled off at normal pressure until the benzene comes over clear (about ⅔ of the total amount of benzene). Subsequently, the batch is left to cool to 40° C. and the catalyst is carefully added. The solution thereupon becomes reddish-brown in color. The reaction mixture is held at 45° C. for about 2–2½ hours without the addition of heat and with brief cooling if needed). The end of the polymerization can be recognized, within the estimated time period given above, quite exactly by the rapid solidification of a sample of the polyester. Thereafter, the reaction product, which has become brownish in color and has an acid number of about 5, is taken up in about 1000 ml. of methylene chloride and combined with about 1 percent of montmorillonite and about 0.5 percent of active charcoal, both by weight of the polyester. The mixture is heated for two hours at 50° C. After filtration of the solution, the methylene chloride is taken off under vacuum. In this way, a rapidly crystallizing polyester having a pale yellow color and the following properties is obtained:

Hydroxy number=41
Acid number=1.5
Melting point=47°–48° C.

EXAMPLE 3

The following reagents are employed:

90.0 g. (1 mol) of butanediol-1,4;
1824.0 g. (16 mols) of epsilon-caprolactone;
200 ml. benzene as an entraining agent; and
0.29 ml. of antimony pentafluoride.

The materials are reacted as in Example 2 and a rapidly crystallizing polyester having a pale yellow color and the following properties is obtained:

Hydroxy number=55
Acid number=1.6
Melting point=45°–47° C.

EXAMPLE 4

Trimethylhexanediol (a mixture of the 2,2,4 and 2,4,4-isomers) and epsilon-caprolactone are reacted in a mol ratio of 1:6 at 30°–35° C. in the presence of 0.05 percent by weight of antimony pentafluoride. The materials are reacted for two hours at this temperature. After purification as described in Example 2, a polyester which is liquid at room temperature and which has the following properties is obtained:

Hydroxy number=131
Acid number=1.2

EXAMPLE 5

A mixture of 37.5 g. (⅛ mol) of 12-hydroxy stearic acid and 114.1 g. (1.0 mol) of epsilon-caprolactone is heated at 35°–40° C. and then combined with 75 mg. of antimony pentafluoride. The temperature of the reaction mixture remains for about 40 minutes at 48°–50° C. without cooling. Subsequently, this temperature is held for a further 2½ hours. The reaction product is taken up in methylene chloride and the solution is refluxed with about 1 percent by weight each of montmorillonite and active charcoal for 2 hours for purification. The solution is filtered and concentrated, whereby a poly(omega-hydroxycarboxylic acid) having an acid number of 44 is obtained.

EXAMPLE 6

284 g. of a polyester glycol of adipic acid and trimethylhexanedial (hydroxy number=197; acid number=2.6) and 285 g. of epsilon-caprolactone are heated to 40° C. 0.05 percent of antimony pentafluoride, by weight of the total reagents present, are added to the reaction mixture, which is then stirred for three hours at 40°–45° C. The product is taken up in methylene chloride and, after purification with montmorillonite and active charcoal, a polyester liquid at room temperature and having the following properties is obtained:

Hydroxy number=98
Acid number=0.8

EXAMPLE 7

3.6 g. of butanediol-1,4 and 456 g. of epsilon-caprolactone (mol ratio=1:100) are mixed and then combined at 45° C. with 0.05 percent by weight of antimony pentafluoride. Because of the extreme mol ratio between the reactants, they are reacted for 5 hours at 45° C. A solution, in methylene chloride, containing about 20 percent by weight of the highly viscous polyester so formed is prepared and then treated as in Example 1 with aqueous ammonia, montmorillonite, and active charcoal for purification. After removal of the solvent under vacuum, a polyester which contains hydroxy groups, which very rapidly crystallizes on cooling, and which has the following properties is obtained:

Hydroxy number=9.0
Acid number=1.8
Melting point=about 52°–55° C.

EXAMPLE 8

Trimethylhexanediol-1,6 (a mixture of the 2,2,4- and 2,4,4-isomers) and γ-methyl-epsilon-caprolactone are reacted in a mol ratio of 1:6 for 2½ hours at 35°–40° C. in the presence of 0.05 percent by weight of antimony pentafluoride. After purification as in Example 2, a polyester having the following properties is obtained:

Hydroxy number=119
Acid number=1.3

EXAMPLE 9

Trimethylhexanediol-1,6 (a mixture of the 2,2,4- and 2,4,4-isomers) and a mixture of β,β, delta-trimethyl-epsilon-caprolactone and β, delta, delta-trimethyl-epsiloncaprolactone prepared from isophorone are reacted in a mol ratio of 1:8 for 3 hours at 35–40° C. in the presence of 0.05 percent by weight of antimony pentafluoride. After purification as in Example 2, a polyester having the following properties is obtained:

Hydroxy number=76
Acid number=1.4

EXAMPLE 10

90 g. of butanediol-1,4, 342 g. of epsilon-caprolactone, and 384 g. of γ-methyl-epsilon-caprolactone are reacted in 250 ml. of methylene chloride for 3 hours at 40° C. in the presence of 0.05 percent by weight of antimony pentafluoride. After purification as in Example 2 and removal of the solvent, a polyester of the following properties is obtained:

Hydroxy number=132
Acid number=1.4

EXAMPLE 11

Example 1 is repeated except that the reaction temperature is kept at 0° C. and the amount of catalyst employed is doubled. The reaction is terminated after 8 hours. The reaction product is worked up as in Example 1. A polyester having the following properties is obtained:

Hydroxy number=43
Acid number=0.9

EXAMPLE 12

684 g. of epsilon-caprolactone and 160 g. of trimethylhexanediol (a mixture of the 2,2,4- and 2,4,4-isomers) are reacted for about four hours at 40°–50° C. in the presence of 0.42 g. (0.05 percent) of antimony pentachloride. Concentrated ammonia is then added dropwise for neutralization (to pH=7), whereupon the reaction product changes from dark red to colorless. There are then added:

422 g. of methylene chloride (50 percent)
16.8 g. of active charcoal (2 percent)
16.8 g. of montmorillonite (2 percent)

and the mixture is refluxed for two hours. After filtration of the solution employing a filter aid comprising cellulose, the methylene chloride is taken off in vacuum. A yellowish polyester having the following properties is obtained:

Hydroxy number=130
Acid number=2–2.5

EXAMPLE 13

364.8 g. of epsilon-caprolactone and 23.6 g. of hexanediol-1,6 are reacted as in Example 12 with 0.08 ml. of antimony pentachloride as the catalyst. After proceeding further as in Example 12, a polyester having the following properties is obtained:

Hydroxy number=56.1
Acid number=2.4

EXAMPLE 14

Proceeding as in Example 12, 456.0 g. of epsilon-caprolactone and 32.0 g. of trimethylhexanediol (a mixture of the 2,2,4- and 2,4,4-isomers) are reacted in the presence of 0.1 ml. of antimony pentachloride as a catalyst. After proceeding further as in Example 12, a polyester having the following properties is obtained:

Hydroxy number=40.3
Acid number=2.3

EXAMPLE 15

637 g. of butanediol-1,4;
17,100 g. of epsilon-caprolactone; and
8.85 g. of antimony pentachloride are combined in a 50 liter flask and held for 8 hours between 20° C. and 30° C. with stirring. Thereafter, 8.5 kg. of methylene chloride are added and the solution of the polyester formed is left to stand at room temperature. The mixture is brought to pH 7 with about 60 ml. of concentrated ammonia, and 1 percent by weight of active charcoal and 1 percent by weight of montmorillonite are added. The solution is refluxed for three hours and then filtered under pressure employing a filter aid comprising cellulose. The methylene chloride is taken off under the vacuum of an aspirator and a rapidly-crystallizing polyester having the following properties is obtained:

Hydroxy number=39
Acid number=1.9

EXAMPLE 16

1026 g. of epsilon-caprolactone and 45.0 g. of butanediol-1,4 are mixed and combined with 1.07 g. (0.46 ml., 0.1 percent by weight) of antimony pentachloride. The mixture reacts under nitrogen for three hours at 40°–50° C. The catalyst is destroyed with 0.5 ml. of distilled water, 5.4 g. (about 0.5 percent, by weight of the total reactants) of hexanediol-1,6 are added, and the mixture is heated slowly to 200° C. in the vacuum from an aspirator. After about six hours at 200° C. and 15 mm. Hg, an almost colorless quickly-crystallizing polyester having the following properties is obtained:

Hydroxy number=51.8
Acid number=0.2
Melting point=49°–50° C.

EXAMPLE 17

1368 g. of epsilon-caprolactone and 320 g. of trimethylhexanediol (a mixture of the 2,2,4- and 2,4,4-isomers) are reacted under nitrogen at 40°–50° C. for about four hours in the presence of 0.82 g. (0.05 percent by weight) of antimony pentachloride. The catalyst is destroyed with 0.5 ml. of distilled water and the mixture is heated to 200° C. under the vacuum of an aspirator. After about 5 hours, a yellowish polyester having the following properties is obtained:

Hydroxy number=128
Acid number=0.8

COMPARISON EXAMPLE 1

Example 2 was repeated using 0.05 percent by weight of $H_2SO_4$ instead of 0.05 percent of antimony pentafluoride as a catalyst. A reaction period about ½ hour longer was required. In addition, the properties of the polyester prepared in the presence of $H_2SO_4$ were less desirable than those of the polyester prepared in the presence of antimony pentafluoride, despite identical purification operations with montmorillonite and active charcoal, as is evident from the following Table:

TABLE I

| Property | Calculated | Found $H_2SO_4$ | $SbF_5$ |
|---|---|---|---|
| Hydroxy number | 47 | 38–40 | 40–42 |
| Acid number | 0 | 4–6.5 | 1.5–2.5 |
| Iodine number | 0 | 0.13 | 0.13 |

COMPARISON EXAMPLE 2

If Comparison Example 1 is repeated at 0° C. using 0.1 percent by weight of antimony pentafluoride or 0.1 percent by weight of $H_2SO_4$, respectively, a significantly more rapid increase in viscosity is observed in the sample using the catalyst of the present invention. Namely, when $SbF_5$ is employed, a crystallization of reaction product begins after only three hours. In contrast, the product catalyzed with $H_2SO_4$ first begins to crystallize after about 9 hours.

COMPARISON EXAMPLE 3

Samples comprising 11.25 g. of butanediol-1,4 and 228 g. of epsilon-caprolactone are reacted at 40° C. after the addition of 0.05 percent by weight, respectively, of either sulfuric acid or antimony pentafluoride as catalyst. A determination of the increase in viscosity as a function of time gave the following results in the presence of these catalysts:

| Elapsed time from the beginning of the reaction (hours) | Viscosity of the reaction mixture (poises, at 50° C.) | |
|---|---|---|
| | SbF$_5$ catalyst | H$_2$SO$_4$ catalyst |
| 0.75 | 0.75 | |
| 1.0 | 1.03 | |
| 1.25 | 2.21 | |
| 1.5 | [1] 2.48 | 0.25 |
| 1.75 | | 0.25 |
| 2.0 | | 0.51 |
| 2.5 | | [1] 0.94 |

[1] Product crystallizes.

EXAMPLE 18

A polyester formed between butanediol-1,4 and epsilon-caprolactone in a mol ratio of 1:24;

45 g. of butanediol-1,4; and
1368 g. of epsilon-caprolactone are mixed and heated to 40° C. Thereafter, 0.7 g. (corresponding with 0.05 percent by weight of the reaction mixture) of triethyloxonium hexachloroantimonate is added and the mixture is reacted at 40°–50° C. for about four hours. 0.5 ml. of water are then added and the reaction mixture is heated to 100° C. After the addition of 0.225 g. of hexanediol-1,6 (0.5 percent of the amount of butanediol), the mixture is heated for nine hours at 200° C. and 15 mm. Hg. After treatment of the crude product with bleaching earths (1–2 percent of the amount of polyester), a colorless crystalline polyester with the following properties is obtained:

Hydroxy number: calculated, 39.7; found, 37.6
Acid number: calculated, 0; found, 0.6

EXAMPLE 19

Epsilon-caprolactone is homopolymerized in the presence of triethyloxonium hexachloroantimonate (V) as follows.

The epsilon-caprolactone to be used in the homopolymerization is distilled with 2 percent of toluene diisocyanate. All glass apparatus employed is first cleaned with chromic acid-sulfuric acid and dried at 150° C. After flushing the reaction vessel with nitrogen, 50 g. of epsilon-caprolactone and 50 g. of anhydrous benzene are added. Then, 0.25 g. (0.5 percent by weight) of triethyloxonium hexachloroantimonate is added and the mixture is stirred for four hours at 120° C. with the exclusion of moisture. The product is then diluted with 50 g. of methylene chloride. Subsequently, the polymer is precipitated with 100 g. of methanol with the formation of a whitish emulsion. This is dried at 100° C. and 15 mm. Hg to obtain a reddish-brown, tough-elastic polymer having a ring-and-ball softening point of 78° C.

EXAMPLE 20

Hydroxy-polybutadiene is reacted with epsilon-caprolactone in the presence of triethyloxonium hexachloroantimonate (V) as follows.

237 g. of anhydrous hydroxy polybutadiene having an hydroxy number=48, an iodine number=406, and a viscosity=90 poises/23° C. are combined with 114 g. of epsilon-caprolactone in the presence of 0.18 g. (0.05 percent) of triethyloxonium hexachloroantimonate at a maximum of 65° C. After destruction of the catalyst, the reaction product can be purified with active bleaching earths, with the optional use of solvents. A liquid having a viscosity of 70 poises at 23° C. and an hydroxy number=29 is obtained. The product contains no free lactone and, in contrast to the starting product, is compatible with liquid diisocyanates of the 4,4'-diisocyanatodiphenylmethylene type.

EXAMPLE 21

Hexanediol-1,6 is reacted with epsilon-caprolactone in a mol ratio of 1:2 in the presence of triethyloxonium tetrafluoroborate as follows:

354 g. of anhydrous hexanediol-1,6 are melted and combined at about 40° C. under a nitrogen atmosphere with 1.0 g. of triethyloxonium tetrafluoroborate. 684 g. of anhydrous epsilon-caprolactone, distilled in the presence of toluene diisocyanate, are then added dropwise at a rate such that the evolved heat maintains the temperature of the reaction mixture between 40°–45° C. Subsequently, the product is maintained at this temperature for about six hours. The yellowish viscous ester produced in this manner has the following properties:

Hydroxy number: calculated, 325; found, 322
Acid number: calculated, 0; found, 3.0

EXAMPLE 22

Butanediol-1,4 is reacted with epsilon-caprolactone in a mol ratio of 1:16 in the presence of triethyloxonium tetrafluoroborate as follows.

90.1 g. of anhydrous butanediol-1,4 are placed in a vessel and 3.8 g. of triethyloxonium tetrafluoroborate are added thereto at 40° C. under a nitrogen atmosphere. 1824.0 g. of anhydrous caprolactone, distilled over toluene diisocyanate, are then added dropwise at such a rate that the evolved heat maintains the temperature of the reaction mixture between 40° and 45° C. Subsequently, the product is kept for about eight hours at this temperature. On cooling, the polyester solidifies to form a waxy product having the following properties:

Hydroxy number: calculated, 58.7; found, 53.2
Acid number: calculated, 0; found, 3.2
Melting point: 44°–45° C.

What is claimed is:

1. A method for preparing a polyester which comprises polymerizing a lactone of the formula

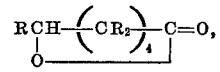

wherein the groups R, which may be the same or different, are hydrogen, methyl, or ethyl, but at most three of the groups R are alkyl, at a temperature from −20° C. to 120° C., in the presence of an initiator which is a non-basic saturated organic hydroxy compound having from 1 to 6 hydroxy groups, and in the further presence of from 0.001 to 0.5 percent, by weight of said reactants, of a catalyst selected from the group consisting of antimony (V) chloride, and antimony (V) fluoride.

2. A method for preparing a polyester which comprises polymerizing a lactone of the formula

wherein the groups R, which may be the same or different, are hydrogen, methyl, or ethyl, but at most three of the groups R are alkyl, at a temperature from −20° C. to 120° C., in the presence of 0.001 to 0.5 percent, by weight of said lactone, of a trialkyl oxonium salt catalyst having 1–4 carbon atoms in the alkyl groups thereof, said oxonium salt being a hexachloroantimonate, a hexafluoroantimonate, or a tetrafluoroborate.

3. A method as in claim 2 wherein said polymerization proceeds in the additional presence of a non-basic organic hydroxy compound having 1 to 6 hydroxy groups.

4. A method as in claim 1 wherein said hydroxy compound is a saturated aliphatic hydrocarbon having at least 2 hydroxy groups.

5. A method as in claim 1 wherein said hydroxy compound is an hydroxy acid.

6. A method as in claim 1 wherein said hydroxy compound is an hydroxy polyester.

7. A method as in claim 1 wherein water is added after polymerization to destroy the catalyst by hydrolysis, forming antimony oxide.

8. A method as in claim 7 wherein the polyester product is then further condensed, in the presence of said antimony oxide, to reduce its acid number.

9. A method as in claim 7 wherein an alkylene diol is then added to the polyester product and polymerized therewith in the presence of said antimony oxide.

10. A method as in claim 1 wherein the polymerization proceeds in an inert organic solvent.

11. A method as in claim 10 wherein a solution of said polyester in said solvent is purified by adsorptive contact with 0.5–2.5 percent of active clay, by weight of said polyester.

12. A method as in claim 1 wherein said catalyst is antimony pentafluoride.

13. A method as in claim 1 wherein said catalyst is antimony pentachloride.

14. A method as in claim 2 wherein said catalyst is triethyl oxonium hexachloro antimonate.

15. A method as in claim 3 wherein said hydroxy compound is olefinically or acetylenically polyunsaturated.

16. A method as in claim 15 wherein said polyunsaturated hydroxy compound is a polybutadiene diol of the formula

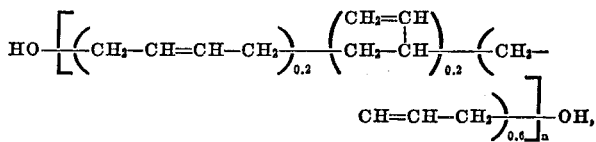

where $n$ has a value between 40 and 50.

References Cited

UNITED STATES PATENTS 2,929,827    3/1960    Carruthers _____ 260—484 R

LORRAINE A. WEINBERGER, Primary Examiner

P. J. KILLOS, Assistant Examiner

U.S. Cl. X.R.

260—468 K, 473 A